United States Patent [19]

McCombs

[11] Patent Number: 4,511,377

[45] Date of Patent: Apr. 16, 1985

[54] APPARATUS FOR THE PRODUCTION OF OXYGEN

[75] Inventor: Norman R. McCombs, Tonawanda, N.Y.

[73] Assignee: Greene & Kellogg, Inc., Tonawanda, N.Y.

[21] Appl. No.: 547,569

[22] Filed: Nov. 1, 1983

[51] Int. Cl.³ .............................................. B01D 53/04
[52] U.S. Cl. ........................................ 55/163; 55/387
[58] Field of Search ......... 55/25, 26, 58, 62, 161–163, 55/189, 387, 389, 179, 180

[56] References Cited

U.S. PATENT DOCUMENTS

| | | | |
|---|---|---|---|
| 2,501,280 | 3/1950 | Kemp et al. | 55/162 |
| 2,625,237 | 1/1953 | Gribler et al. | 55/179 X |
| 2,633,928 | 4/1953 | Chamberlain | 55/162 |
| 3,069,830 | 12/1962 | Skarstrom et al. | 55/58 |
| 3,182,435 | 5/1965 | Axt | 55/163 X |
| 3,323,291 | 6/1967 | Kern | 55/179 X |
| 3,543,482 | 12/1970 | Foster | 55/162 |
| 3,679,369 | 7/1972 | Hashimoto et al. | 55/163 X |
| 4,272,265 | 6/1981 | Snyder | 55/179 X |
| 4,342,573 | 8/1982 | McCombs et al. | 55/161 |
| 4,373,938 | 2/1983 | McCombs | 55/179 X |
| 4,378,982 | 4/1983 | McCombs | 55/162 |

FOREIGN PATENT DOCUMENTS 45761  4/1977  Japan .................................... 55/163

Primary Examiner—Robert Spitzer
Attorney, Agent, or Firm—Roylance, Abrams, Berdo & Goodman

[57] ABSTRACT

A housing for a single bed, pressure swing adsorption oxygen concentration system. The device is modularized for ease of manufacture and service with particular emphasis on sound suppression.

12 Claims, 7 Drawing Figures

APPARATUS FOR THE PRODUCTION OF OXYGEN

BACKGROUND OF THE INVENTION

The use of oxygen for the treatment of various respiratory disorders has been a common medical technique for decades. The major source of this oxygen was originally high pressure cylinders requiring periodic replacement. In the early 1970's the cost and cumbersome nature of high pressure cylinders inspired the development of an electrically operated device known as the oxygen concentrator.

Three basic methods of oxygen production have been employed in these devices, electrolytic decomposition of water, air separation using permeable membranes and pressure swing absorption. Of these, pressure swing adsorption (PSA) is the most commonly used and offers several advantages over the other techniques.

Over the past decade PSA oxygen concentrators have evolved into efficient, technologically sophisticated devices. The present invention was developed particularly to house a particular PSA system utilizing a single adsorption bed.

REFERENCE TO RELATED APPLICATION

The PSA system for which the present invention was developed as a housing is disclosed and claimed in co-pending patent application Ser. No. 547,494, filed in the name of the present inventor and a co-inventor Ravinder K. Bansal, on even date herewith.

SUMMARY OF THE INVENTION

The present invention housing is particularly suitable for a single bed PSA device. The housing is characterized by the fact that the surge tank, adsorbent bed, and the process valving are modularized. The modularization allows for ease of service and manufacture, reduced cost of manufacture, higher reliability, and other inherent advantages.

The invention also includes a particular unique feature wherein the switching valve is rigidly affixed to the feed air compressor which is also self-contained in the housing. This arrangement greatly improves the delivery of air into the device, and the rejection of waste gas from the single adsorbent bed.

Finally, the invention includes means to deaden sound, with particular emphasis on preventing any direct line of sight arrangement so that sound propagation is substantially eliminated.

DETAILED DESCRIPTION OF THE PREFERRED EMBODIMENT

Figure 1:
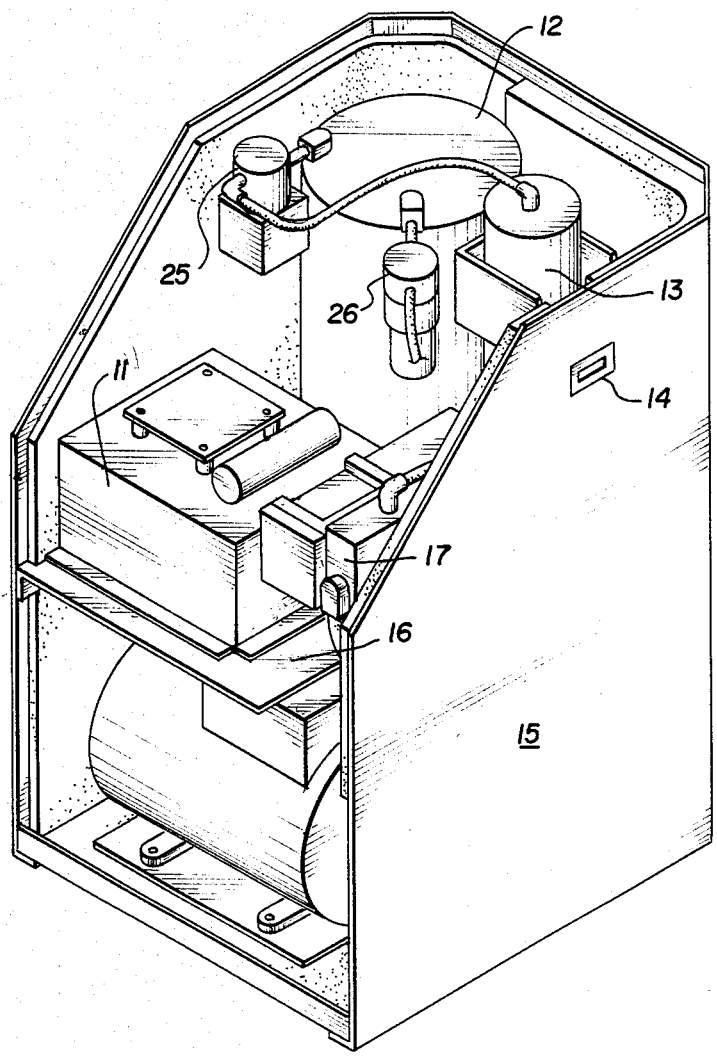
FIG. 1 is a perspective view of the invention housing with the PSA system in place, and with the cover removed for the sake of clarity.

Referring now to the drawings and in particular to FIG. 1, the cover and outer shell 15 are preferably made of vinyl clad aluminum sheet. In its lower section, shell 15 houses a reciprocating type air compressor 10 with a four way control solenoid valve 17 rigidly connected to it. This four way control valve is supported by the piping 30 through which it alternately connects the suction or discharge port of the compressor to the single adsorption bed 13.

Figure 5:
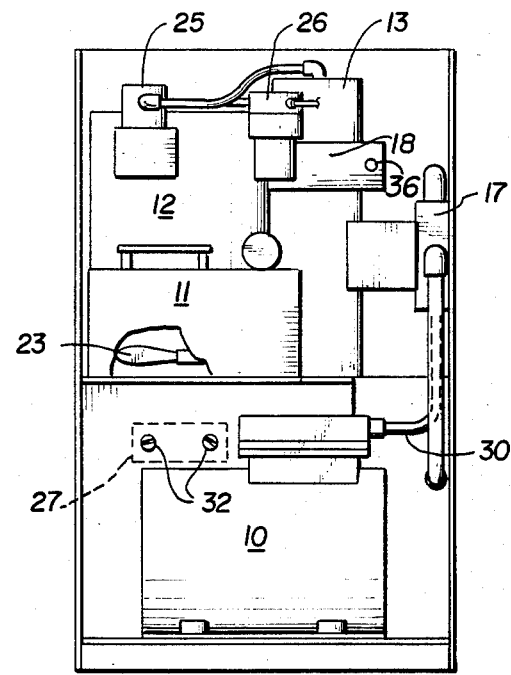
FIG. 5 is a front plan view thereof.

A fan shroud 17 encloses a waffle type cooling fan 23, all FIG. 5 and also serves as a mounting surface for the electronic controls.

Adsorbent bed 13 is preferably an aluminum tube mounted to surge tank 12 by clamp 18 welded to the surge tank 12. A screw or bolt 36 removably holds bed 13 in clamp 18. A process solenoid valve 25 and pressure regulator 26 are rigidly piped into surge tank 12. Surge tank 12 is fastened by welded clamp 27 to bulkhead 16 with two machine screws 32.

The entire assembly of the surge tank 12, adsorbent bed 13, process solenoid valve 25 and pressure regulator 26 can be removed from the cabinet by simply removing these two machine screws. This greatly facilitates manufacture of the device and subsequent service or repair. The design of clamp 18 affixing the adsorbent bed 13 to the surge tank 12 also allows for its easy removal independent of the rest of the assembly.

Referring now to FIGS. 2 through 5, as mentioned above, the four way valve 17 alternately connects the adsorbent bed 19 to the suction or discharge ports of the compressor 10. This connection is made with flexible plastic tubing 21 using standard compression fittings. Waste nitrogen is rejected to the atmosphere through conduit 20 consisting of a flexible plastic tube and resonating volume. This tube discharges into a foam lined chamber beneath the surge tank assembly for sound suppression.

Compressor suction air is supplied to the adsorbent bed through conduit 19 also consisting of a flexible plastic tube and resonating volume for sound suppression.

Figure 6:
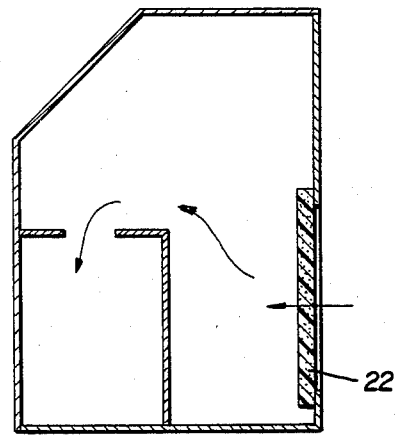
FIGS. 6 and 7 are schematic diagrams showing the flow path of air through the invention housing.
Figure 7:
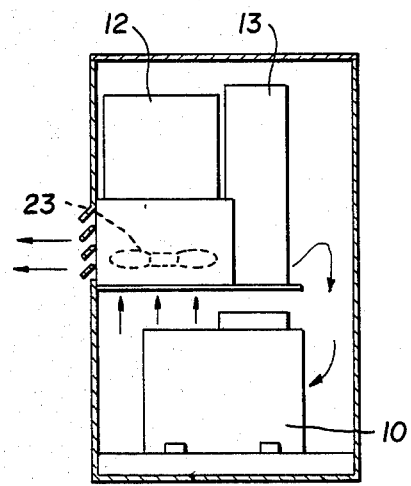
Figure 2:
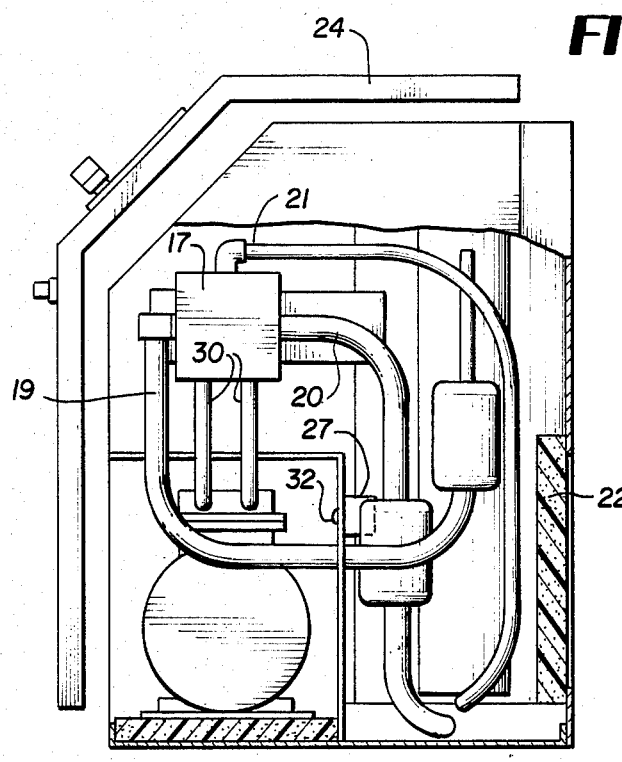
FIG. 2 is a side elevational view thereof partly in cross-section, showing the cover slightly removed from the remainder of the cabinet.
Figure 3:
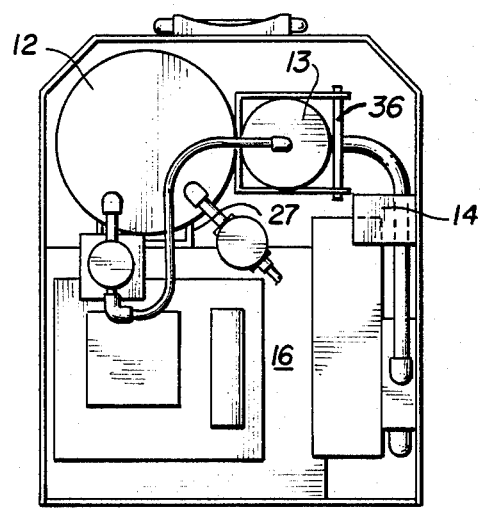
FIG. 3 is the top plan thereof.
Figure 4:
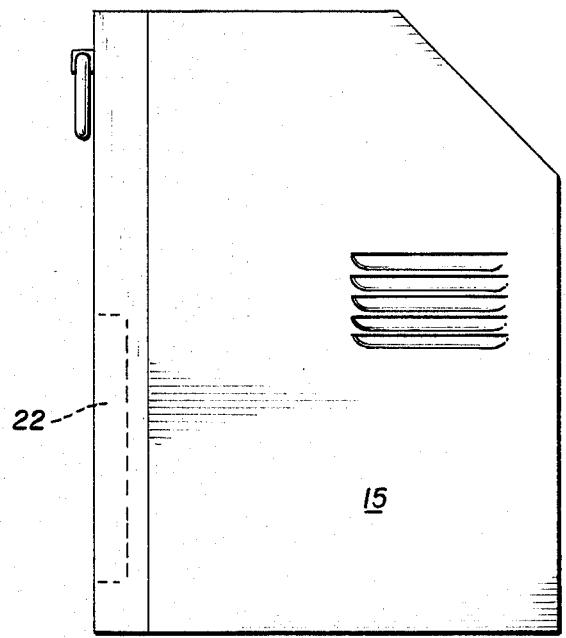
FIG. 4 is an external side view opposite to the side shown in FIG. 2.

Cooling air for the compressor is drawn through a rear filter foam inlet 22 by fan 23. FIGS. 6 and 7 show the air flow path. The particular air pattern is particularly effective in reducing noise since it eliminates line of sight sound propagation from the compressor (10).

Acoustic foam, as shown in FIG. 1, is used on all hard internal surfaces to aid in noise reduction. Also included is an hours meter 14 to allow for usage, service and billing timing as desired.

While the invention has been described in detail above, it is to be understood that this detailed description is by way of example only, and the protection granted is to be limited only within the spirit of the invention and the scope of the following claims.

What is claimed is:

1. A modularized PSA machine comprising a housing; said machine comprising a single bed of adsorbent material, a surge tank, a process solenoid valve, and a pressure regulator; means to join said single bed, said surge tank, said process solenoid valve and said pressure regulator together into a single module, means to removably mount said single module into said housing; whereby said module may be pre-fabricated apart from said housing, and then easily removed from and replaced into said housing to facilitate service and maintenance of said PSA machine.

2. The machine of claim 1, said single module comprising means to removably mount said single bed into said single module so as to permit removal of said single bed from said machine and from said single module without removing said entire single module from said PSA machine.

3. The machine of claim 2, last mentioned removable mounting means comprising clamp means joined to said surge tank, and bolt means to removably secure said bed into said clamp means.

4. The machine of claim 1, said housing comprising a bulkhead fixed therein; said means to removably mount said single module into said housing comprising clamp means fixed to said surge tank and screw means removably joining said clamp means to said fixed bulkhead.

5. The machine of claim 1, said means joining said single bed, said surge tank, said process solenoid valve and said pressure regulator together comprising at least in part the air flow piping means needed in any event to functionally interconnect said single bed, said surge tank, said process solenoid valve and said pressure regulator together, whereby said air flow piping means serves as both air flow conduit means and structural interconnecting means.

6. The machine of claim 1, and a second pre-fabricated module comprising an air compressor and a control solenoid valve directing air flow with respect to said air compressor, means to mount said control valve on said compressor, said mounting means comprising the air flow piping between said control valve and said compressor, means to interconnect said first mentioned single module and said second module together inside said housing, and said two modules together comprising effectively the entire functioning parts of said machine.

7. In a PSA machine housing a single adsorbent bed and a housing, the improvement comprising a pre-fabricated module comprising an air compressor and a control solenoid valve directing air flow with respect to said air compressor, means to mount said control valve on said compressor, said mounting means comprising the air flow piping between said control valve and said compressor, whereby said air flow piping between said air compressor and said control valve serves the dual functions of both air flow conduit means and also physical mounting means therebetween, and means to mount said module into said housing, whereby said module may be pre-fabricated apart from said housing, and then easily removed from and replaced into said housing to facilitate service and maintenance of said PSA machine.

8. The machine of claim 7, said machine comprising a surge tank, a process solenoid valve, and a pressure regulator; means to join said single bed, said surge tank, said process solenoid valve and said pressure regulator together into a single module, means to removably mount said single module into said housing; whereby said module may be pre-fabricated apart from said housing, and then easily removed from and replaced into said housing to facilitate service and maintenance of said PSA machine.

9. The machine of claim 7, said single module comprising means to removably mount said single bed into said single module so as to permit removal of said single bed from said machine and from said single module without removing said entire single module from said PSA machine.

10. The machine of claim 9, last mentioned removable mounting means comprising clamp means joined to said surge tank, and bolt means to removably secure said bed into said clamp means.

11. The machine of claim 7, said housing comprising a bulkhead fixed therein; said means to removably mount said single module into said housing comprising clamp means fixed to said surge tank and screw means removably joining said clamp means to said fixed bulkhead.

12. The machine of claim 7, said means joining said single bed, and surge tank, said process solenoid valve and said pressure regulator together comprising at least in part the air flow piping means needed in any event to functionally interconnect said single bed, said surge tank, said process solenoid valve and said pressure regulator together, whereby said air flow piping means serves as both air flow conduit means and structural interconnecting means.

* * * * *